US009148776B1

(12) United States Patent
Schroeder

(10) Patent No.: US 9,148,776 B1
(45) Date of Patent: Sep. 29, 2015

(54) NETWORK ADDRESS PRESERVATION IN MOBILE NETWORKS

(75) Inventor: Hartmut Schroeder, Duisburg (DE)

(73) Assignee: Pulse Secure, LLC, San Jose, CA (US)

(*) Notice: Subject to any disclaimer, the term of this patent is extended or adjusted under 35 U.S.C. 154(b) by 735 days.

(21) Appl. No.: 13/247,357

(22) Filed: Sep. 28, 2011

(51) Int. Cl.
*G06F 11/00* (2006.01)
*H04W 8/08* (2009.01)
*H04L 29/12* (2006.01)

(52) U.S. Cl.
CPC ........... *H04W 8/087* (2013.01); *H04L 61/6022* (2013.01)

(58) Field of Classification Search
CPC .......................... H04W 8/087; H04L 61/6022
USPC ............................................................. 726/4
See application file for complete search history.

(56) References Cited

U.S. PATENT DOCUMENTS

| | | | |
|---|---|---|---|
| 7,254,119 B2* | 8/2007 | Jiang et al. | 370/328 |
| 7,489,659 B2* | 2/2009 | Siorpaes et al. | 370/331 |
| 8,019,346 B2* | 9/2011 | Sachs et al. | 455/439 |
| 8,769,626 B2* | 7/2014 | Gundavelli et al. | 726/4 |
| 2002/0023174 A1* | 2/2002 | Garrett et al. | 709/245 |
| 2004/0122959 A1 | 6/2004 | Lortz | |
| 2005/0025164 A1* | 2/2005 | Kavanagh et al. | 370/401 |
| 2005/0074126 A1 | 4/2005 | Stanko | |
| 2006/0120171 A1* | 6/2006 | Touati et al. | 365/189.05 |
| 2007/0197237 A1 | 8/2007 | Powell et al. | |
| 2009/0028082 A1 | 1/2009 | Wynn et al. | |
| 2009/0036128 A1 | 2/2009 | Raguparan et al. | |
| 2009/0168754 A1* | 7/2009 | Shan | 370/352 |
| 2011/0063997 A1* | 3/2011 | Gras et al. | 370/254 |
| 2011/0296504 A1 | 12/2011 | Burch et al. | |
| 2012/0008578 A1* | 1/2012 | Kant et al. | 370/329 |
| 2012/0170521 A1* | 7/2012 | Vogedes et al. | 370/329 |

OTHER PUBLICATIONS

GPRS, GPRS System PDP Context, 2007, Retrieved from the Internet <URL: gprstechnology.blogspot.com/2007/04/pdp-context.html>, pp. 1-2 as printed.*
No stated author, eTutorials (Chapter: § 3.1 Wireless Hotspots); 2008; Retrieved from the Internet <URL: web.archive.org/web/20081121011012/http://etutorials.org/Microsoft+Products/windows+xp+unwired/Chapter+3.+Wi-Fi+on+the+Road/3.1+Wireless+Hotspots/; pp. 1-4 as printed.*
Nikitopoulos et al.; Authentication platform for seamless handover in heterogeneous environments; 2005; Retrieved from the Internet <URL: http://ieeexplore.ieee.org/xpls/abs_all.jsp?arnumber=1559888>; pp. 1-7 as printed.*
U.S. Appl. No. 12/967,977, by Vikki Yin Wei, filed Dec. 14, 2010.
U.S. Appl. 13/247,308, by Hartmut Schroeder, filed Sep. 28, 2011.

* cited by examiner

*Primary Examiner* — Michael Chao
(74) *Attorney, Agent, or Firm* — Shumaker & Sieffert, P.A.

(57) ABSTRACT

A cellular service provider network includes a subscriber database that associate identifiers from the cellular mobile devices (e.g., IMSIs stored within SIM cards of the devices) with layer three (L3) network addresses currently assigned to the cellular mobile device by the cellular network for providing data service to the cellular mobile devices. The subscriber database further stores identifiers for wireless local area network (WLAN) interfaces of the cellular mobile devices. The cellular service provider network includes a server coupled to a layer two (L2) network having a plurality of wireless access points. In response to access requests from the cellular mobile devices over the L2 network, the server queries the subscriber database of the cellular service provider network and assigns the network addresses to the cellular mobile devices by matching L2 network addresses specified within the access requests with the identifiers of WLAN interfaces stored in the subscriber database.

20 Claims, 12 Drawing Sheets

NETWORK ADDRESS PRESERVATION IN MOBILE NETWORKS

TECHNICAL FIELD

The disclosure relates to mobile networks and, more specifically, to wireless access networks.

BACKGROUND

Use of cellular mobile devices for accessing computer data networks has recently increased dramatically. These mobile devices, often referred to as "smart" phones, provide a platform for both cellular phone calls and cellular-based access to computer data services. For example, a typical cellular network is a collection of cells that each include base stations capable of transmitting and relaying radio signals to subscribers' mobile devices. A "cell" generally denotes a distinct area of a cellular network that utilizes a particular frequency or range of frequencies for transmission of data. A typical base station is a tower to which are affixed a number of antennas that transmit and receive the data over the particular frequency. Mobile devices may transmit radio signals at the designated frequency to the base stations to initiate cellular telephone calls or packet-based data services.

With respect to data services, cellular service providers convert the cellular signals, e.g., Time Division Multiple Access (TDMA) signals, Orthogonal Frequency-Division Multiplexing (OFDM) signals or Code Division Multiple Access (CDMA) signals, received from mobile devices at the base stations into Internet protocol (IP) packets for transmission within packet-based networks. A number of standards have been proposed to facilitate this conversion and transmission of cellular signals to IP packets, such as a general packet radio service (GPRS) standardized by the Global System for Mobile Communications (GSM) Association, a Universal Mobile Telecommunications System (UMTS), an evolution of UMTS referred to as Long Term Evolution (LTE), as well as other standards proposed by the $3^{rd}$ Generation Partnership Project (3GPP), $3^{rd}$ Generation Partnership Project 2 (3GPP/2) and the Worldwide Interoperability for Microwave Access (WiMAX) forum.

In this way, the cellular service provider provides data services and connectivity to the cellular mobile devices, allowing the cellular mobile devices to access various packet data networks (PDNs). The PDNs provide a variety of packet-based data services to the cellular mobile device and allow the wireless devices to exchange service data with application or other servers of the PDNs. PDNs may include, for example, the Internet, an enterprise intranet, a layer three (L3) VPN, and a service provider's private network. A service provider's cellular network transports subscriber traffic exchanged between the cellular mobile device and the PDN.

The ubiquitous use of cellular mobile devices and the ever increasing desire by users for fast network access from around the world has presented many challenges. For example, the ubiquitous use of cellular mobile devices have placed a high demand for data services over the service provider's cellular network, often straining the cellular network and resulting in delayed or lost data communications. Some cellular mobile devices, in addition to supporting connections to a PDN via a radio interface, also support wireless capabilities to exchange data via an alternate access network that is separate from the cellular network of the mobile service provider. For example, many cellular mobile devices include a wireless local area network (WLAN) interface that provides data service when in the presences of a WiFi "hotspot" or other wireless access point (WAP). Other examples of such wireless capabilities may include Bluetooth or Near Field Communication (NFC). When in the presence of a WLAN, a user may wish to transition the data services of the cellular mobile device to the WLAN so as to accelerate data transmissions and avoid any delays associated with the cellular network.

SUMMARY

Transitioning between the cellular network and a WLAN presents many challenges. For example, a cellular mobile device often experiences service interruption when transitioning between the cellular network and a local WLAN. This may be problematic for applications currently running on the device, especially data streaming applications or voice-over IP (VoIP) communications. For example, switchover from the cellular network to the WLAN may require that existing communications sessions be renewed or completely reconstructed. Moreover, such transitions often make it difficult or impossible for the service provider to accurately charge for services provided to the cellular mobile device.

In general, this disclosure describes techniques for network address preservation as a cellular mobile device roams between a cellular network and other local wireless networks, such as wireless local area networks (WLANs). The techniques may help achieve more seamless mobility in which existing services are uninterrupted by the transition between networks. The techniques may be utilizes to help ensure that the same network address (e.g., Internet Protocol address) current assigned to the cellular mobile device is subsequently assigned to the mobile device upon transitioning to a different type of access network.

In some examples, the techniques described herein may provide for seamless transition without necessarily requiring that subscriber data traffic from the alternate access network (e.g., WLAN) be backhauled to an anchoring device (e.g., gateway) within the cellular network. That is, the techniques described herein may avoid any requirement that the subscriber data traffic be tunneled back to an anchoring termination point within the cellular network, such as may typically be required with IPSec-based or SSL VPN-based solutions. Moreover, the techniques described herein may be utilized with substantially existing network infrastructure without requiring substantial redeployment of technology.

In one aspect, the cellular service provider network includes a subscriber database of records for subscribers. The records associate identifiers from the cellular mobile devices (e.g., IMSIs stored within SIM cards of the devices) with layer three (L3) network addresses assigned to the cellular mobile device by the cellular network for providing data service to the cellular mobile devices. The records of the subscriber database further store identifiers for wireless local area network (WLAN) interfaces of the cellular mobile devices. The authentication system includes a server coupled to a layer two (L2) network having a plurality of wireless access points. In response to access requests from the cellular mobile device over the L2 network, the server queries the subscriber database of the cellular service provider network and assigns the network addresses to the cellular mobile devices based on identifiers of WLAN interfaces specified within the access requests.

In another aspect, a method is directed to a cellular network assigns a network address to a cellular mobile device and provides data services to the cellular mobile device through the cellular network using the network address. The method includes maintaining a subscriber database that associates an identifier from the cellular mobile device with the network address assigned to the cellular mobile device by the cellular network. The subscriber database further stores an identifier for a wireless local area network (WLAN) interface of the cellular mobile device that provides data service to the cellular mobile device when in the presence of a local wireless network. The method further includes receiving, with an authentication server of the service provider network, a network access request from an access device of a layer two (L2) network coupling the service provider network to the local wireless network, wherein the network access request specifies the identifier for the WLAN interface for the cellular mobile device. The method includes accessing the subscriber database based on the identifier of the WLAN interface specified within the request to select the network address assigned to the cellular mobile device by the cellular network; and outputting a message from the authentication server to the access device to assign the selected network address to the cellular mobile device for receiving data service within the L2 network.

In another aspect, a computer-readable storage medium includes instructions for causing a processor to receive, with an authentication server of the service provider network, a network access request from an access device of a layer two (L2) network, wherein the network access request specifies an L2 network address of a wireless local area network (WLAN) interface of a cellular mobile device. The computer-readable instructions cause the processor to access a subscriber database to select a layer three (L3) network address currently assigned to the cellular mobile device a cellular network, wherein the subscriber database includes a record that specifies an International Mobile Subscriber Identifier (IMSI) stored within a subscriber identity module (SIM) of the cellular mobile device, the L3 network address currently assigned to the cellular mobile device by the cellular network for providing data service to the cellular mobile device, and the L2 network address of the WLAN interface of the cellular mobile device In another aspect, a system comprises a cellular network to provide data services to a plurality of cellular mobile devices, and a layer two (L2) network having a plurality of wireless access points to provide data services to the cellular mobile devices over wireless local area network (WLAN) interfaces of the cellular mobile devices. A subscriber database stores records that specify: (i) International Mobile Subscriber Identifiers (IMSIs) stored within subscriber identity module (SIMs) of the cellular mobile devices, (ii) the layer three (L3) network address currently assigned to the cellular mobile device by the cellular network, and (iii) layer two (L2) network address of the WLAN interfaces of the cellular mobile device. A server, in response to access requests from the cellular mobile device over the L2 network, queries the subscriber database of the cellular service provider network and assigns the network addresses to the cellular mobile devices based on identifiers of WLAN interfaces specified within the access requests.

The details of one or more examples are set forth in the accompanying drawings and the description below. Other features, objects, and advantages will be apparent from the description and drawings, and from the claims.

DETAILED DESCRIPTION

Figure 1A:
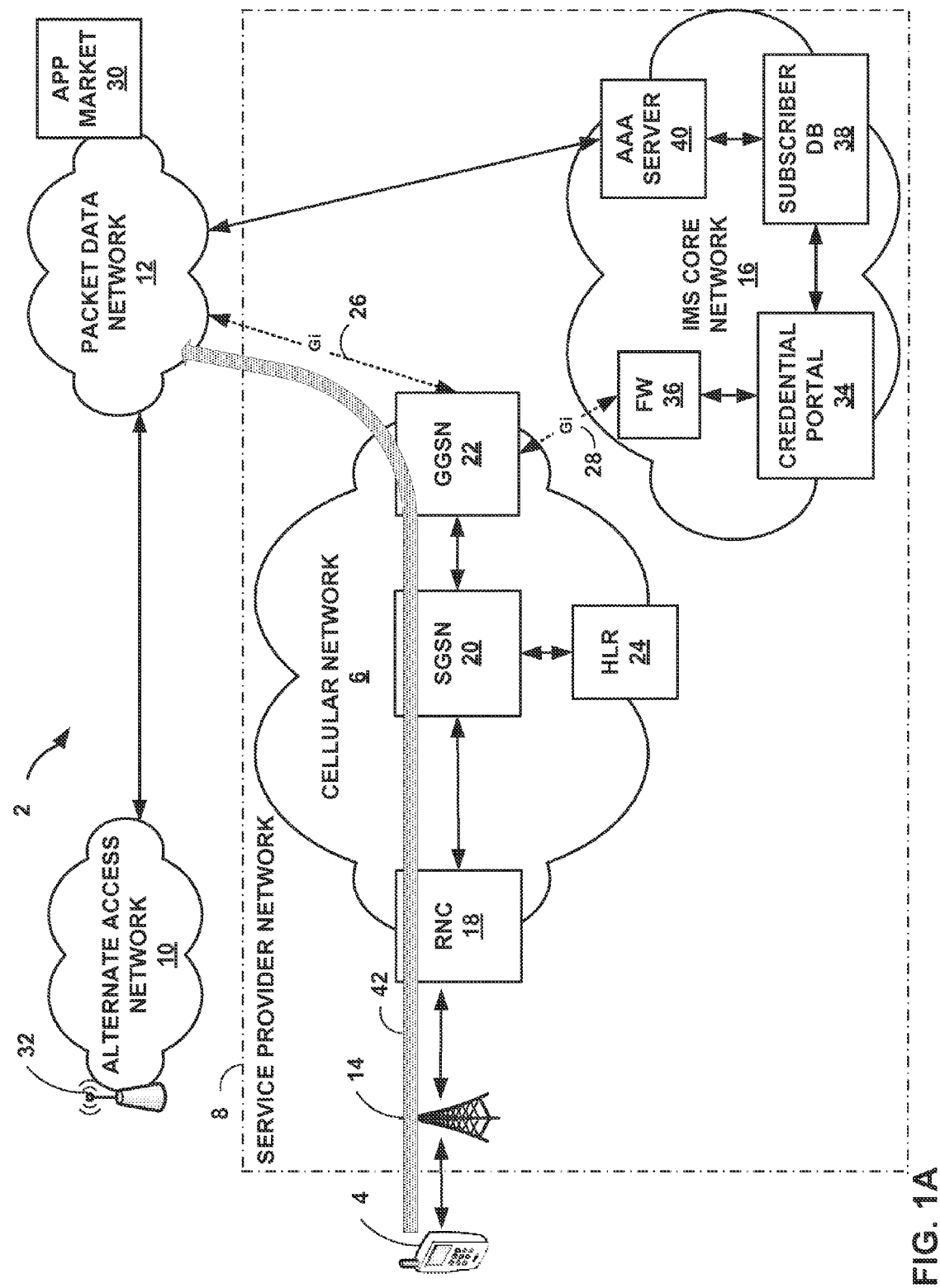
FIGS. 1A-1C are block diagrams illustrating example network systems that include network components operating according to the described techniques.

FIG. 1A is a block diagram illustrating an example network system 2 in which various network components operate in accordance with the described techniques. In the example of FIG. 1A, network system 2 includes network components that automatically provide seamless authentication of a cellular mobile device 4 while transitioning between cellular network 6 of a service provider (SP) network 8 and an alternate access network 10 outside of the SP network 8. Network system 2 includes an example SP network 8 having a cellular network 6 that allows data communications between a cellular mobile device 6 and a packet data network (PDN) 12, such as the Internet.

The techniques of this disclosure allow for offloading data communications from the service provider's cellular network 6 to alternate access network 10 outside of cellular network 6. After cellular mobile device 4 has initially been authenticated by devices in cellular network 6 to communicate with PDN 12 and IP Multimedia Subsystem (IMS) core network 16 via cellular network 6, cellular mobile device 4 may travel into range of an access point of alternate access network 10. As described in further detail below, the techniques of this disclosure allow cellular mobile device 4 to leverage its prior authentication on cellular network 6 and automatically obtain credentials for authenticating on alternate access network 10, without requiring any action by a user of cellular mobile device 4. After cellular mobile device 4 is logged on to alternate access network 10, cellular mobile device 4 can send wireless data communications to PDN 12 via alternate access network 10 instead of cellular network 6.

Cellular mobile device 4 represents any mobile communication device that supports both cellular radio access and local wireless (so called, "WiFi") network access, e.g., by way of a wireless LAN interface using any of the 802.11 communication protocols. Cellular mobile device 4 may comprise, for example, a mobile telephone, a laptop or other mobile computer having, e.g., a 3G/4G wireless card, a smart phone, or a personal data assistant (PDA) having both cellular and WLAN communication capabilities. Cellular mobile device 4 may run one or more software applications, such as VoIP clients, video games, videoconferencing, E-mail, and Internet browsers, among others. PDN 12 supports one or more packet-based services that are available for request and use by cellular mobile device 4. Certain applications running on cellular mobile device 4 may require access to services offered by PDN 12, such as mobile calls, video games, videoconferencing, and email, among others. Cellular mobile device 4 may also be referred to, in various architectural embodiments, as User Equipment (UE) or mobile station (MS). One example of a cellular mobile device is described in U.S. patent application Ser. No. 12/967,977 filed Dec. 14, 2010, entitled "MULTI-SERVICE VPN NETWORK CLIENT FOR CELLULAR MOBILE DEVICE," incorporated herein by reference. Cellular mobile device 4 stores a unique identifier such as, for example, an International Mobile Subscriber Identity (IMSI), or an International Mobile Equipment Identity (IMEI) stored, for instance, in a subscriber identity module (SIM) or in a memory or integrated circuit of cellular mobile device 4.

A service provider operates SP network 8 to provide network access, data transport and other services to cellular mobile device 4. SP network 8 comprises base station 14, cellular network 6, and IMS core network 16. Cellular mobile device 4 communicates with base station 14 over wireless links to access SP network 8.

The service provider provisions and operates cellular network 6 to provide network access, data transport and other services to cellular mobile device 4. In general, cellular network 6 may implement any commonly defined cellular network architecture including those defined by standards bodies, such as the Global System for Mobile communication (GSM) Association, the $3^{rd}$ Generation Partnership Project (3GPP), the $3^{rd}$ Generation Partnership Project 2 (3GPP/2), the Internet Engineering Task Force (IETF), and the Worldwide Interoperability for Microwave Access (WiMAX) forum. For example, cellular network 6 may represent one or more of a GSM architecture, a General Packet Radio Service (GPRS) architecture, a Universal Mobile Telecommunications System (UMTS) architecture, and an evolution of UMTS referred to as Long Term Evolution (LTE), each of which are standardized by 3GPP. Cellular network 6 may, alternatively or in conjunction with one of the above, implement a code division multiple access-2000 ("CDMA2000") architecture. Cellular network 6 may, again as an alternative or in conjunction with one or more of the above, implement a WiMAX architecture defined by the WiMAX forum.

In the example of FIG. 1A, SP network 8 comprises a Universal Mobile Telephony Service (UMTS) network that operates in accordance with the 3rd Generation Partnership Project (3GPP) standards and with the techniques described herein. For purposes of illustration, the techniques herein will be described with respect to a UMTS network. However, the techniques are applicable to other communication network types in other examples. For instance, the techniques are similarly applicable to network architectures and nodes deploying 3GPP/2, CDMA2000, WiMAX, and Mobile IP based technologies and standards.

In this example, cellular network 6 includes radio network controller (RNC) 18 coupled to base station 14. RNC 18 and base station 14 provide wireless access by cellular mobile device 4 to cellular network 6. Base station 14 may be a Node B base transceiver station that uses an air interface to communicate with user equipment in the geographic region (or "cell") that base station 14 serves. In some examples, base station 14 is a femtocell. Cellular mobile device 4 is located within the cell served by base station 14. SP network 8 may, in some instances, include additional base stations, each of which may serve one of several cells. In some examples, base station 14 may be another type of wireless transceiver station, such as a site controller or a WiMAX access point. User equipment, such as cellular mobile device 4, may be referred to in alternative architectures as a mobile station (MS).

In the illustrated embodiment, cellular network 6 includes serving GPRS support node 20 ("SGSN 20"), and gateway GPRS support node 22 ("GGSN 22"). SGSN 20 switches mobile traffic to available GGSNs, such as GGSN 22. Cellular network 6 also includes RNC 18, which manages and routes data to/from base station 14 to SGSN 20. RNC 18 may establish and support GTP tunnels to SGSN 20. In some instances, RNC 18 comprises an IP router. In some embodiments, SP network 8 may include additional RNCs and associated base stations variously arranged.

SGSN 20 and GGSN 22 provide packet-switched (PS) services to RNC 18. For example, SGSN 20 and GGSN 22 provide packet routing and switching, as well as mobility management, authentication, and session management for cellular mobile device 4 served by RNC 18. The packet-switched services provided by SGSN 20 and GGSN 22 may include mobility services, such as authentication and roaming services, as well as call handling services, signaling, billing, and internetworking between cellular network 6 and external networks, such as PDN 12. For example, SGSN 20 serves RNC 18. Cellular mobile device 4 connects to SGSN 20, sending identifying credentials for the SIM card inside cellular mobile device 4 (e.g., an IMSI) to SGSN 20 via RNC 18, which SGSN 20 uses to authenticate the cellular mobile device in cooperation with Home Location Register (HLR) 24. In some examples, HLR 24 may be connected to AAA server 40.

GGSN 22 is a gateway node that connects cellular network 6 to PDN 14 via Gi interface 26 operating over a physical communication link (not shown). GGSN 22 also connects cellular network 6 to IMS core network 16 via Gi interface 28 operating over another physical communication link (not shown) or the same interface 26 as for PDN 14. SGSN 10 obtains data traffic from RNC 18, e.g., traffic from cellular mobile device 4, and routes the data traffic to GGSN 22. GGSN 22 decapsulates the data traffic, and initiates IP traffic on the Gi interfaces 26, 28. GGSN 22 enables access to one or more services provided by servers via PDN 14, and GGSN 22 maps accessible services to access points. In the example of FIG. 1A, one service includes an applications market ("APP market") 30 reachable via packet data network 12. Cellular mobile device 4 may download executable applications from application market 30, to be executed on an operating system of cellular mobile device 4.

In some situations, a subscriber associated with cellular mobile device 4 may wish to receive data services via alternate access network 10 instead cellular network 6 of SP network 8. Alternate access network 10 may be, for example, a WLAN network. In the example of FIG. 1A, alternate access network 10 includes WLAN access point 32, to which cellular mobile device 4 can attach in order to access the services available through PDN 12. The techniques of this disclosure allow for seamless authentication of cellular mobile device 4 on alternate access network 10 when the cellular mobile device transitions between cellular network 6 of SP network 8 and alternate access network 10 outside of the SP network 8. As discussed in further detail below, in some aspects, cellular mobile device 4 may download an application ("app") having a WiFi Offload Manager application that provides support for seamless offloading and authentication of cellular mobile device 4 onto alternate access network 10 when cellular mobile device 4 moves from cellular network 6 to alternate access network 10. Alternatively, cellular mobile device 4 may be preloaded with the WiFi Offload Manager by its manufacturer.

As shown in FIG. 1A, IMS core network 16 includes credential portal 34, which communicates with the WiFi Offload Manager application executing on cellular mobile device 4 to facilitate transition between cellular network 6 and alternate access network 10. Credential portal 34 may be, for example, a provisioning server or other device that maintains subscriber database 38 within IMS core network 16. Initially, cellular mobile device 4 is authenticated on cellular network 6 by SGSN 20 in cooperation with HLR 24 and connects to PDN 12 to exchange data communications 42 with PDN 12.

Figure 1B:
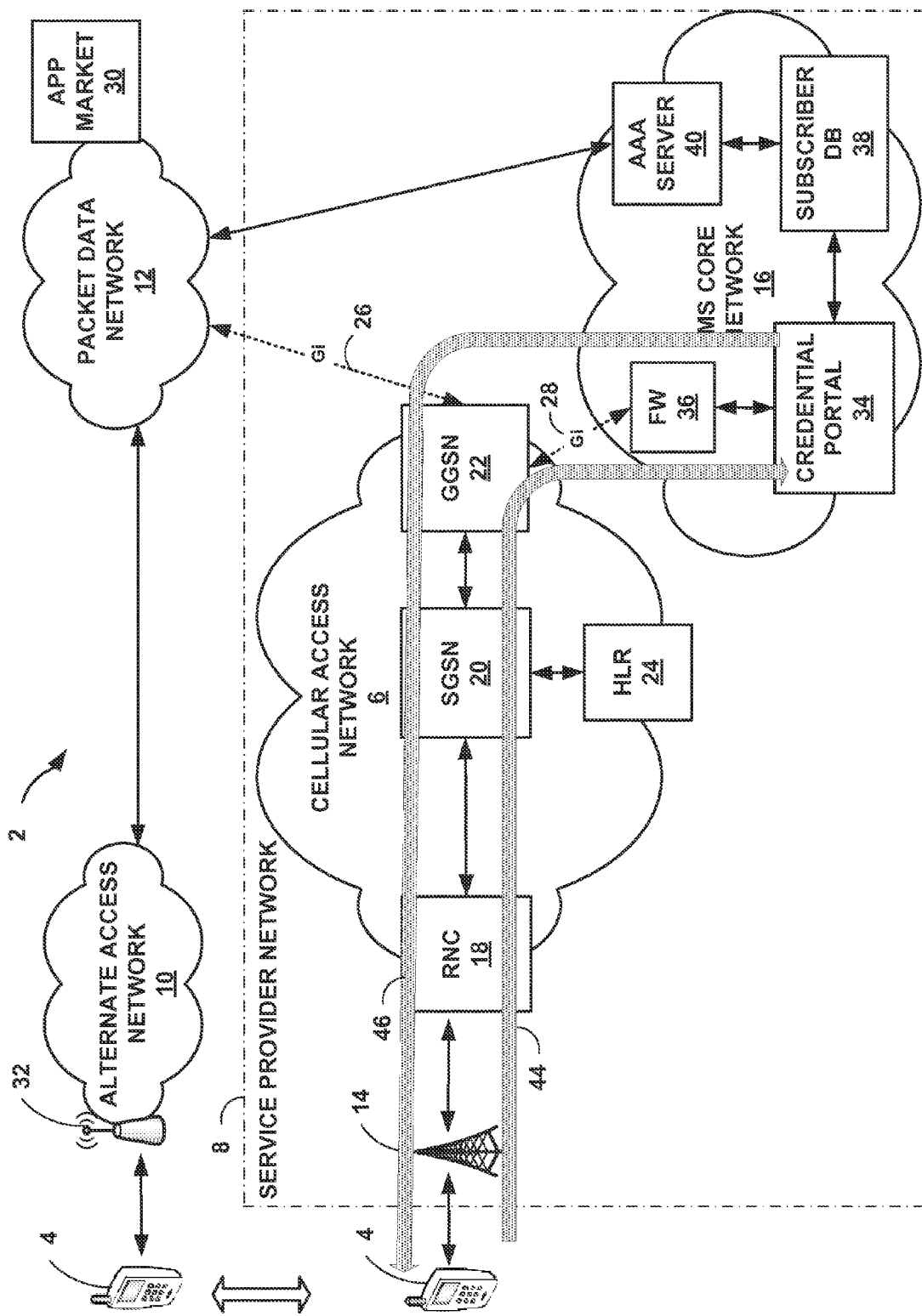

FIG. 1B illustrates WiFi Offload Manager of cellular mobile device 4 communicating with credential portal 34 in the background to provide credential portal 34 with certain identifying information for cellular mobile device 4. For example, when cellular mobile device 4 is connected to cellular network 6, the WiFi Offload Manager on cellular mobile device 4 may establish a communication session with credential portal 24 (e.g., an HTTPS session) and communicate via eXtensible Markup Language (XML)-based messages or Simple Object Access Protocol (SOAP) messages 44. At this time, WiFi Offload Manager reports an identifier (e.g., IMSI or IMEI) stored with the SIM card of cellular mobile device 4 or on the cellular device itself, and a WLAN Media Access Control (MAC) address of the cellular mobile device. Using the existing data services of cellular network 6, cellular mobile device 4 sends the message 44 to credential portal 34, which receives the message via firewall 36 coupled to GGSN 22.

By virtue of the message from cellular mobile device 4 coming through firewall 36, credential portal 34 can ascertain that cellular mobile device 4 has already been authenticated by SGSN 20. Furthermore, at this time, credential portal 34 may also learn the layer three (L3) network address (e.g., IP address) currently allocated to cellular mobile device 4 for use in receiving data services from cellular network 6. For example, credential portal 34 may examine the source IP address of messages 44 received from the WiFi Offload Manager executing on cellular mobile device 4. At this time, credential portal 34 generates a username and password based on the identifying information received from cellular mobile device 4, and sends a message 46 that includes the username and password back to cellular mobile device 4 for use in authentication on alternate access network 10. Moreover, credential portal 34 updates a subscriber record within subscriber database 38 to store the identifier of cellular mobile device 4 (e.g., the IMSI or IMEI), the layer two (L2) MAC address of the WLAN interface of the cellular mobile device, the generated username and password, and the layer three (L3) network address currently assigned to the cellular mobile device. Subscriber database 38 may be, for example, a Structured Query Language (SQL) database. As shown, subscriber database 38 may be accessed by (or integrated within) Authentication, Authorization, and Accounting (AAA) server 40 (e.g., a RADIUS server), for use in authenticating cellular mobile device 4. In some embodiments, subscriber database 38 may be integrated with HLR 24. In some aspects, credential portal 34 may also obtain WLAN policy information for the Wi-Fi Offload Manager from subscriber database 38, and may include the WLAN policy information in the message with the username and password.

As shown in FIG. 1B, cellular mobile device 4 may subsequently request access to alternate access network 10 using its WLAN interface in communication with WLAN access point 32. At this time, alternate access network 32 may request a username and password, which mobile cellular device 4 automatically supplies based on the credential information received from credential portal 34. AAA server 40 receives the credential information from alternate access network 10 along with the layer two (L2) MAC address for the WLAN interface of mobile cellular device 4. AAA server 40 accesses subscriber database, such as by using the identifier of the WLAN interface and/or the username as a key, and verifies that the credential information automatically provided by mobile cellular device 4 over alternate access network 10 match the credentials previously generated by credential portal 34 for the device having that particular WLAN interface or assigned that username.

Figure 1C:
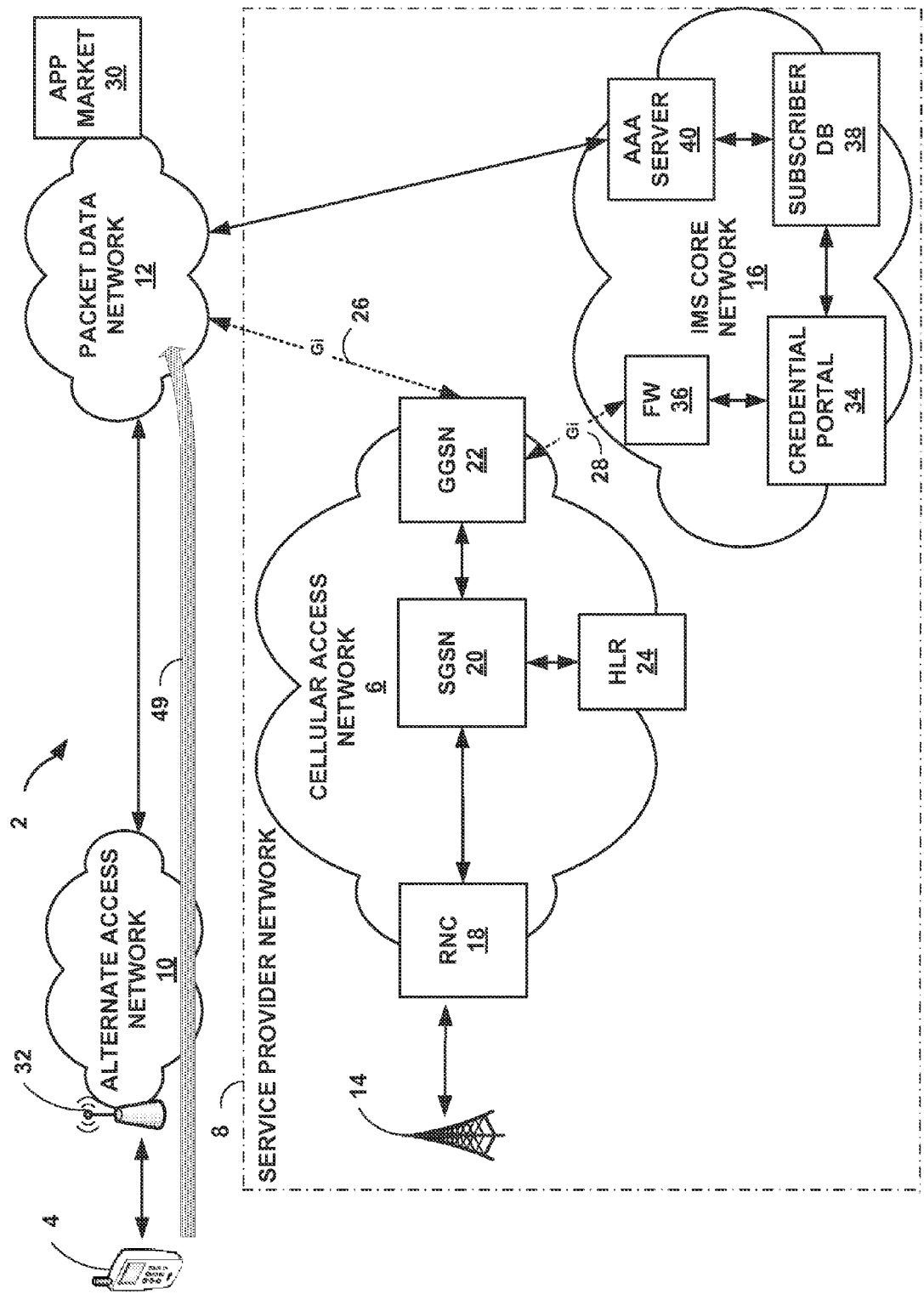

As shown in FIG. 1C, once authenticated, cellular mobile device 4 continues to communicate with PDN 12 and exchanges data communications 49 with PDN 12 through alternate access network 10 instead of cellular network 6. Although described for purposes of example with respect to a WLAN access point, the techniques of the disclosure may be applied to offload data communications to other types of wireless capabilities, such as Bluetooth, Near Field Communication (NFC), for example. The techniques of this disclosure may be applied to both WiFi Protected Access (WPA) Enterprises and Wireless Internet Service Provider roaming (WISPr) V1.0 Gateways. In some aspects, WLAN access point 34 may send usage information for cellular mobile device 4 to AAA server 40, which AAA server 40 can use for subscriber billing purposes. The geographic location of WLAN access point 32 relative to SP network 8 need not be limited, as long as WLAN access point 32 connected in some way to AAA server 40 of IMS core network 16.

Figure 2:
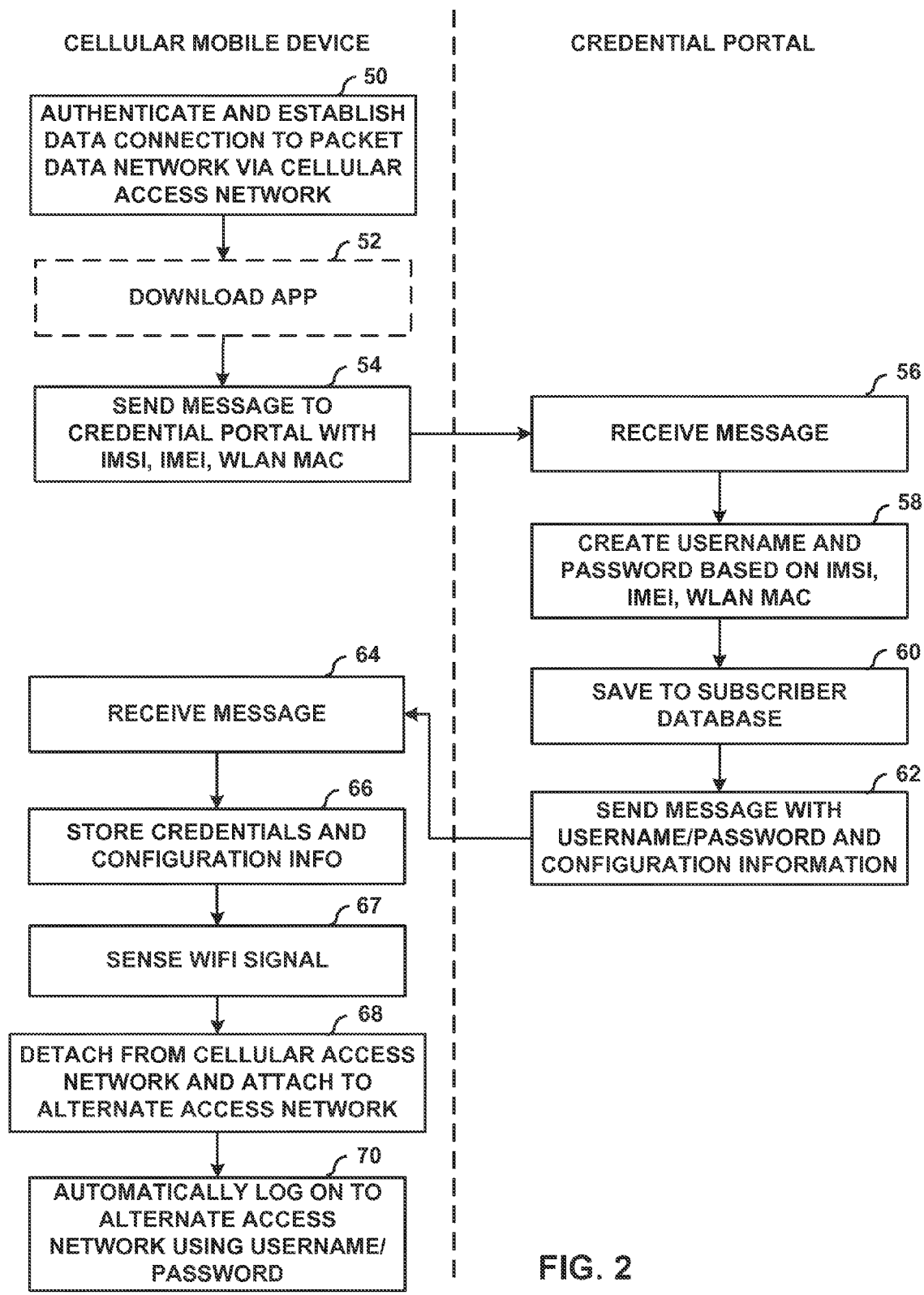
FIG. 2 is a flowchart illustrating example operation of a cellular mobile device and credential portal in accordance with aspects of this disclosure.

FIG. 2 is a flowchart illustrating example operation of cellular mobile device 4 and credential portal 34 in accordance with aspects of this disclosure. Cellular mobile device 4 is authenticated by SGSN 22 and HLR 24, e.g., using SIM credentials of cellular mobile device 4. After authentication, cellular mobile device 4 can exchange data communications with PDN 12 and IMS core network 16 via cellular network 6 (50). Cellular mobile device 4 optionally downloads a WiFi offload manager app from app market 30 (e.g., an electronic store or other repository) via PDN 12. The WiFi offload manager app may be received as a software package provided by a manufacturer of cellular mobile device 4. Alternatively, the WiFi offload manager app may come pre-loaded on the cellular mobile device (52).

Upon connecting to cellular network 6, the WiFi offload manager application executing on cellular mobile device 4 obtains cellular mobile device identifier(s), e.g., IMSI and/or IMEI, from the Subscriber Identity Module (SIM) card of cellular mobile device 4 or from the device itself. The WiFi offload manager also obtains the WLAN MAC from cellular mobile device 4.

The WiFi offload manager generates a communication that includes the IMSI and IMEI of cellular mobile device 4, and the WLAN MAC address of cellular mobile device 4, and sends the communication to the credential portal 34 (54). For example, the communication may take the form of a SOAP message, XML, or other message type, and may be sent via a Hypertext Transfer Protocol Secure (HTTPS) tunnel to credential portal 34. In one example aspect, cellular mobile device 4 may obtain the IP address of credential portal 34 via a DNS request to a DNS server (not shown in FIGS. 1A–1C). As another example, the IP address of credential portal 34 may be programmed into the WiFi offload manager application executing on cellular mobile device 4.

In response to receiving the message from the WiFi offload manager (56), credential portal 34 generates a username and password based on the IMSI/IMEI and WLAN MAC address provided by cellular mobile device 4 (58). Credential portal 34 may, for example, generate a username that uses a Network Access Identifier (NAI) (e.g., joe_doe@att.com) to identify the user in third party roaming based on realms. Credential portal 34 stores the username and password to subscriber database 38 (60). That is, credential portal 34 updates a subscriber record within subscriber database 38 to associate the identifier (IMSI/IMEI) of cellular mobile device 4 and the generated credentials with the identifier (e.g., L2 MAC address) for the WLAN interface of the cellular mobile device. In addition, credential portal 34 may update the subscriber record to store a layer three (L3) network address (e.g., IP address) currently assigned to cellular mobile device 4 by the cellular network for providing data service to the cellular mobile device 4.

Subscriber database 38 may optionally provide WLAN offload policy information for the WiFi offload manager in the message. The policies may inform cellular mobile device 4 when to offload to the alternate access network 10 and which credentials to use then. In addition, the WLAN access point can obtain policies due to network management or for a particular session (cellular mobile device that is using the network), but these may be provided through AAA server 40. Credential portal 34 creates a message to send to the cellular mobile device 4 via the HTTPS tunnel that includes the username and password. In some embodiments, the message may also include the WLAN policy and possibly other configuration information. Credential portal 34 sends the message to cellular mobile device (62), e.g., via a SOAP message or XML.

Cellular mobile device 4 receives the message from credential portal 34 (64). In response to receiving the communication, cellular mobile device 4 programs the WiFi offload manager to use the credentials and policies when a WLAN access network is to be accessed (68). For example, the WiFi offload manager on cellular mobile device 4 may upon receipt apply the received credentials (username and password) to the PEAP or TTLS supplicant or WISPr V1.0 Smartclient on cellular mobile device 4 to be automatically supplied when later authenticating cellular mobile device 4 on alternate access network 10 using WLAN access point 32. This authentication then occurs without requiring any user input. For example, authentication may be triggered when cellular mobile device 4 senses the WiFi signal from WLAN access point 32, which may happen immediately after the credentials or stored, or at a later time (67). For example, cellular mobile device 4 may detect a signal having strength above a predefined threshold. Cellular mobile device 4 may in some embodiments look specifically for a WiFi signal from a WLAN access point 32 owned by the service provider that operates SP network 8. Cellular mobile device 4 sends an authentication message such as an 802.1x PEAP or TTLS authentication message to WLAN access point 32 that includes the username and password. WLAN access point 32 forwards the 802.1x PEAP/TTLS message to AAA server 40 with the WLAN MAC address of the cellular device 4 that is attached and requesting authentication.

AAA server 40 checks the username and password and the WLAN MAC address received in the PEAP/TTLS message against subscriber database 38. If the credentials match those stored by credential portal 34 in subscriber database 38 for the particular WLAN MAC address, AAA server 40 proceeds with authentication of cellular mobile device 4 on alternate access network 10 (70). At this point, cellular mobile device 4 is able to continue to exchange data communications with PDN 12 via alternate access network 10. In this manner, the authentication of cellular mobile device 4 on alternate access network 10 by AAA server 40 can proceed as usual according to 802.1x, without requiring access by AAA server 40 to the SIM credentials of cellular mobile device 4.

The techniques need not necessarily require user input to authenticate the cellular mobile device 4 on the alternate access network 10. For example, the user need not necessarily input a username and password to switch to the WLAN access point. Instead, the WiFi offload manager executing on the cellular mobile device can automatically obtain the authentication credentials and provide them to AAA server 40. Moreover, authenticating the cellular mobile device 4 on the alternate access network occurs may automatically without disruption to services provided from the packet data network to the cellular mobile device 4.

The exchange between cellular mobile device 4 and credential portal 34 may occur as soon as cellular mobile device 4 can reach credential portal 34, such as the first time cellular mobile device 4 is started with a connection manager. The devices may be configured to repeat this exchange as often as desired to refresh the password, and also may be done just before cellular mobile device 4 moves to the WLAN network. Alternatively, a single username/password may be used for the lifetime of cellular mobile device 4. The cellular mobile device 4 may therefore still be able to use the provided login credentials when cellular mobile device 4 senses an alternate access network 10 but cannot reach cellular network 6 anymore to obtain credentials.

Figure 3:
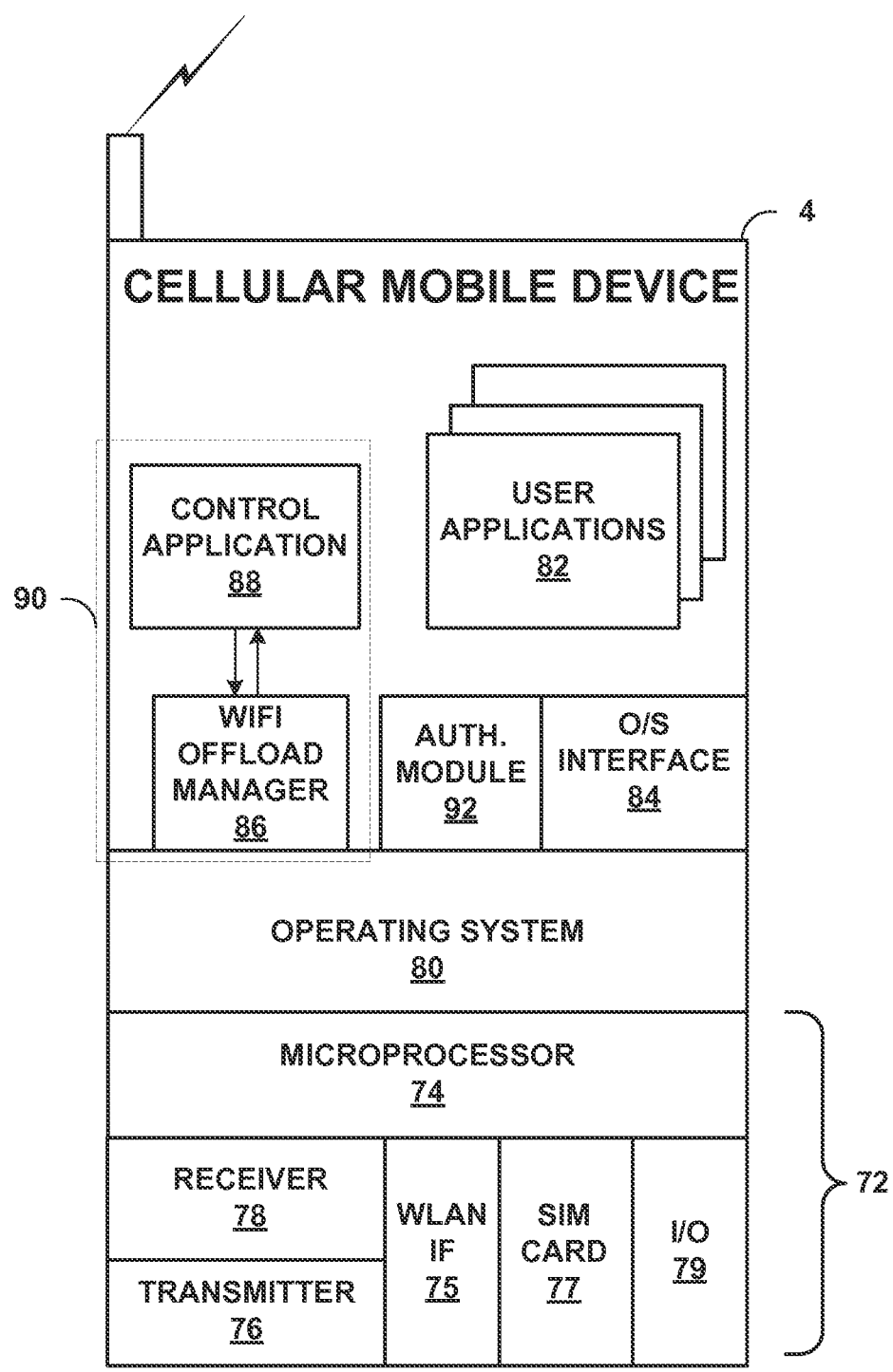
FIG. 3 is a block diagram illustrating an example embodiment of a cellular mobile device that operates in accordance with the techniques described herein.

FIG. 3 is a block diagram illustrating an example embodiment of a cellular mobile device 4 that operates in accordance with the techniques described herein. In this example, cellular mobile device 4 includes a hardware 72 that provides core functionality for operation of cellular mobile device 4. Hardware 72 may include one or more programmable microprocessors 74 configured to operate according to executable instructions (i.e., program code), typically stored in a computer-readable medium such as static, random-access memory (SRAM) device or Flash memory device. Transmitter 76 and receiver 78 communicate with other communication devices via a wireless communication, such as cellular communications in the form of high-frequency radio frequency (RF) signals. Hardware 72 may include additional discrete digital logic or analog circuitry. WLAN interface (IF) 75 is an interface, such as a wireless access card, used for connecting to a wireless network, and has an associated a L2 address, such as a MAC address, referred to as a WLAN MAC address of cellular mobile device 4. WLAN IF may send and receive wireless communications according to 802.3, and use the IEEE 802.1x standard for authentication. SIM card 77 stores information that uniquely identifies cellular mobile device 4, including an IMSI. Input/output component (I/O) 79 allows data signals to be input and output from cellular mobile device 4. As one example, a user of cellular mobile device 4 may interact with cellular mobile device 4 via I/O 79.

Operating system 80 executes on microprocessor 74 and provides an operating environment for one or more user applications 82 (commonly referred to "apps"). 0/S interface 84 proves an interface layer of software capable of making kernel calls into operating system 80. In other words, O/S interface 84 provides a framework within which WiFi offload manager 86 operates and may, for example, allow WiFi offload manager 86 to execute within a "user" space of the operating environment provided by cellular mobile device 4. O/S interface 84 may allow other forms of protocol handlers to be "plugged in" for interfacing with operating system 80. O/S interface 84 interacts with operating system 80 to provide OS-level support for protocol-specific handlers.

In some cases, executable code for control application 88 and WiFi offload manager 84 may be distributed as a single distribution package 90 that is downloadable from a standard "app" deployment mechanism, such as provided by a server associated with an electronic store or other repository for user applications, and/or provided by a manufacturer of cellular mobile device 4. That is, control application 80 and WiFi offload manager 84 may be integrated into a multi-service client for cellular mobile device 4 to allow easy deployment. An application management utility on cellular mobile device 4 may, for example, issue a request to an App market 30 server and, in response receive distribution package for processing and installation on cellular mobile device 4. Control application 80 may provide a user interface by which a user of cellular mobile device 4 is able to configure and manage WiFi offload manager 84.

After cellular mobile device 4 is authenticated on cellular network 6 by interacting with SGSN 20 and HLR 24 and using its SIM credentials, cellular mobile device 4 exchange data communications with PDN 12 via cellular network 6. When WiFi offload manager 84 of cellular mobile device 4 is attached to the cellular network 6, WiFi offload manager 84 obtains the IMSI from the SIM card 77 of cellular mobile device 4, and/or the IMEI from cellular mobile device 4 and generates a message that includes the IMSI and IMEI. WiFi offload manager 84 also obtains the WLAN MAC address of WLAN interface 75 of cellular mobile device 4 and includes this in the message. WiFi offload manager 84 sends the message via an HTTPS tunnel to credentials portal 34 of IMS core network 16 over cellular network 6. The message may be, for example, a SOAP message or XML. As another example, WiFi offload manager 84 may cause cellular mobile device 4 to transmit the credentials information to credential portal 34 by a Short Message Service (SMS) message.

WiFi offload manager 84 also processes a response message received from credential portal 34, e.g., via a SOAP message, XML, SMS, or the like. The response message includes a username and password generated by credential portal 34, and may also include WLAN policy information for WLAN access point 32. WiFi offload manager 84 stores the username, password, and WLAN policy information to memory of cellular mobile device 4. Authentication module 92 uses the stored username and password for authentication with AAA server 40 (e.g., 802.1x authentication) to log on to alternate access network 10. Authentication module 92 may also use the WLAN policies to use (e.g., SSID to use for WiFi).

Figure 4:
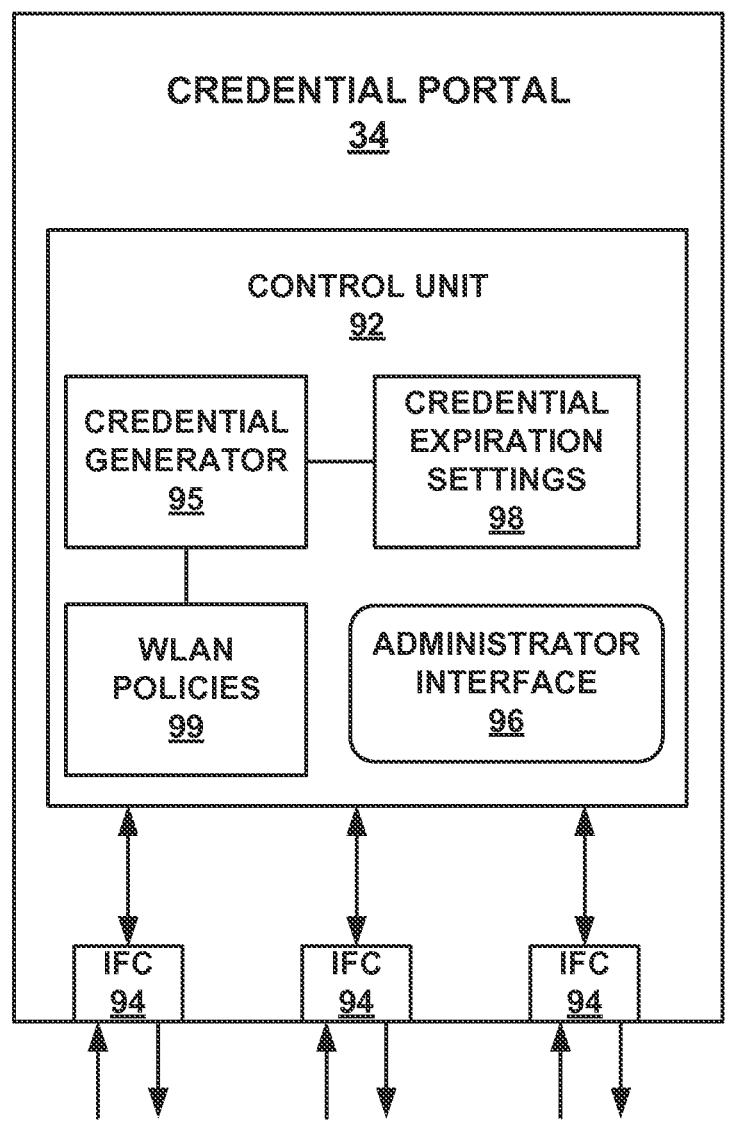
FIG. 4 is a block diagram illustrating an example embodiment of a credential portal in accordance with the techniques of this disclosure.

FIG. 4 is a block diagram illustrating an example embodiment of a credential portal 34 in accordance with the techniques of this disclosure. In the example of FIG. 4, credential portal 34 includes a control unit 92 and a set of interface cards (IFCs) 94 for communicating packets via inbound links and outbound links. As one example, credential portal 34 may be a provisioning server.

Control unit 92 includes credential generator 95. Credential generator 95 generates a username and password for a cellular mobile device 4 based on the IMSI/IMEI, and WLAN MAC address received from cellular mobile device 4. The username and password may be persistent credentials, or may be one-time use credentials for cellular mobile device 4, requiring that cellular mobile device 4 obtain new credentials each time cellular mobile device 4 logs on to alternate access network 10, or upon expiration of a time period. Credential generator 95 forms a message to send to cellular mobile device 4 that includes the generated username and password.

Control unit 92 includes an administrator interface 96, by which a network administrator can configure credential portal 34. For example, the administrator may configure credential expiration settings 98, which may include a time period after which a given username/password will expire for a cellular mobile device. The time period may be a fixed period of time after which the credentials will expire. Credential portal 34 may also provide information about credential expiration settings 98 to cellular mobile device 4 when providing credentials.

Control unit 92 also includes WLAN policies 99, which credential generator 95 may access to obtain WLAN policies specific to the WLAN MAC address provided by cellular mobile device 4. WLAN policies provide configuration information for cellular mobile device 4 for WiFi usage on the alternate access network 10. WLAN policies 99 may include, for example, a broadcast SSID to use on the WiFi network, priority level to be used for the offloading, credential renewal policies, and other policies.

In some embodiments, additional aspects may also be included to increase security. For example, the username/passwords provided by credential portal 34 may expire after a configurable time period, e.g., daily, hourly, or other time period. When the username/password combination expires on cellular mobile device 4, WiFi offload manager 84 may send a new message with the IMSI, IMEI, and WLAN MAC to credential portal 34, and credential portal 34 returns a new username/password. The expiration time period may be configured on credentials manager 34 and WiFi offload manager 84, e.g., depending on service provider preferences. As another example of enhanced security features, WiFi offload manager 84 may require a new password to be assigned by credentials manager 34 before cellular mobile device 4 returns to alternate access network 10, should cellular mobile device 4 return to the cellular network 6 in the interim. As another example, credentials portal 34 may transfer authentication credentials by an out-of-band transport mechanism, such as SMS, for example.

Figure 5:
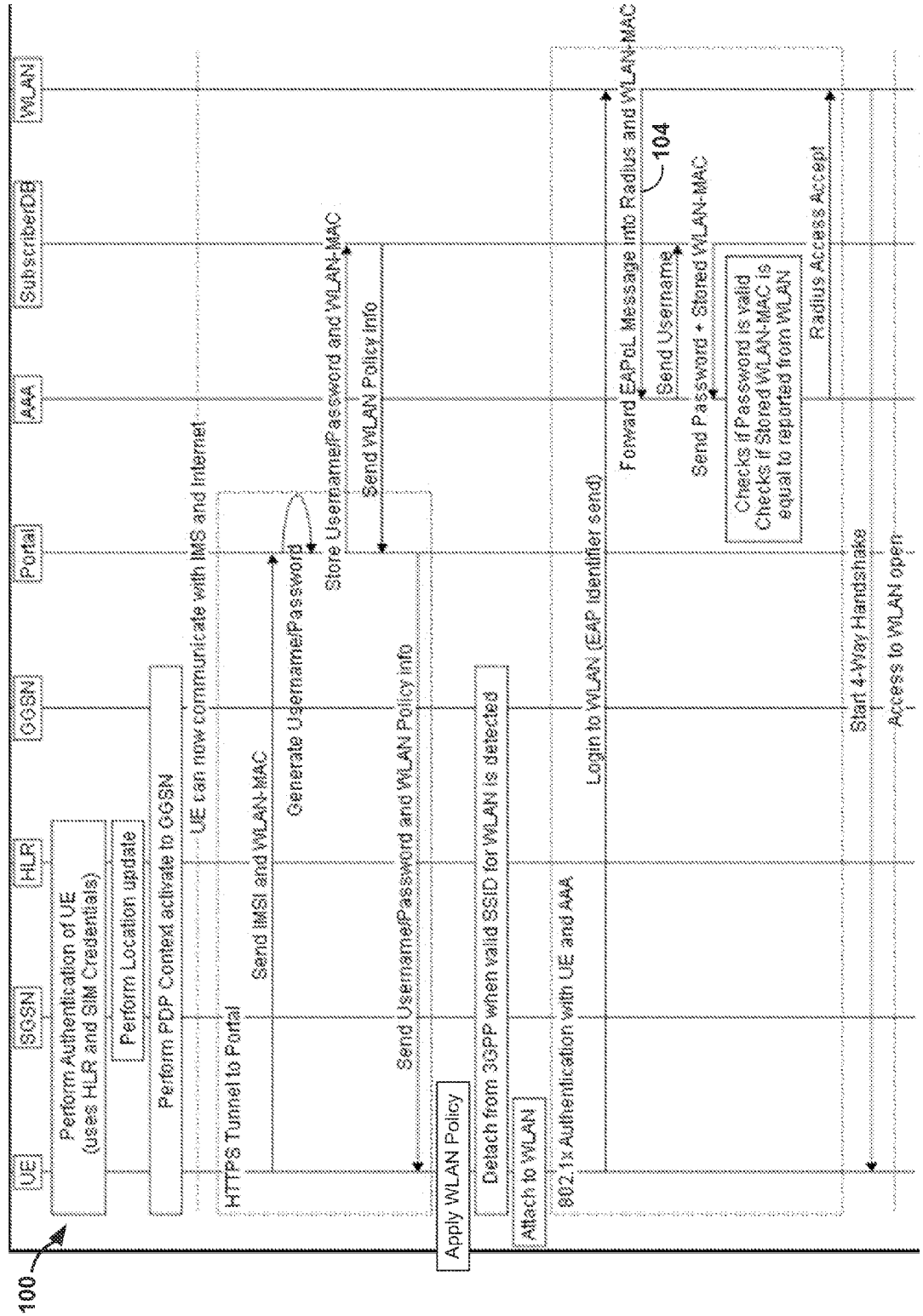
FIGS. 5-6 are sequence diagrams illustrating example operation of network devices in accordance with the techniques of this disclosure.

FIG. 5 is a sequence diagram 100 illustrating example operation of network devices in accordance with the techniques of this disclosure. The example of FIG. 5 illustrates operation of User Equipment (UE) (e.g., cellular mobile device 4), SGSN 20, HLR 24, GGSN 22, a portal (e.g., credential portal 34), AAA 40, and WLAN access point 32, in operating in accordance with one example aspect of this disclosure. Specifically, FIG. 5 illustrates example operation in a WPA network. As shown in FIG. 5, the UE, SSGN, and HLR perform authentication of the UE over cellular network 6. After the PDP Context activate to the GGSN, the UE can communicate with IMS core network 16 and PDN 12 (e.g., the Internet).

AAA server 40 checks the username and password and the WLAN MAC address received in the PEAP/TTLS message against subscriber database 38. If the credentials match those stored by credential portal 34 in subscriber database 38, AAA server 40 proceeds with authentication of cellular mobile device 4 on alternate access network 10, and then cellular mobile device 4 can exchange data communications with PDN 12 via alternate access network 10. In this manner, the authentication of cellular mobile device 4 on alternate access network 10 by AAA server 40 can proceed as usual according to 802.1x, without requiring access by AAA server 40 to the SIM credentials of cellular mobile device 4.

In addition, during authentication with the AAA server 40, WLAN access point 32 may report the WLAN MAC address that was given to cellular mobile device 4 (e.g., within an EAPoL message 104). AAA server 40 queries subscriber database 38 with the username, and subscriber database 38 returns the stored password and WLAN MAC address associated with the username. After AAA server 40 checks whether the password and WLAN MAC are valid and matching, AAA server 40 sends a RADIUS Access Accept to WLAN access point 32. Checking the WLAN MAC address can be optional, and used as an additional security check to avoid a user of cellular mobile device 4 sharing a received username and password from credential portal 34 with other cellular mobile devices that have not been authenticated through SGSN 20 of cellular network 6, and that then try to log in on alternate access network 10 using the username and password but through a different WLAN MAC address.

Figure 6:
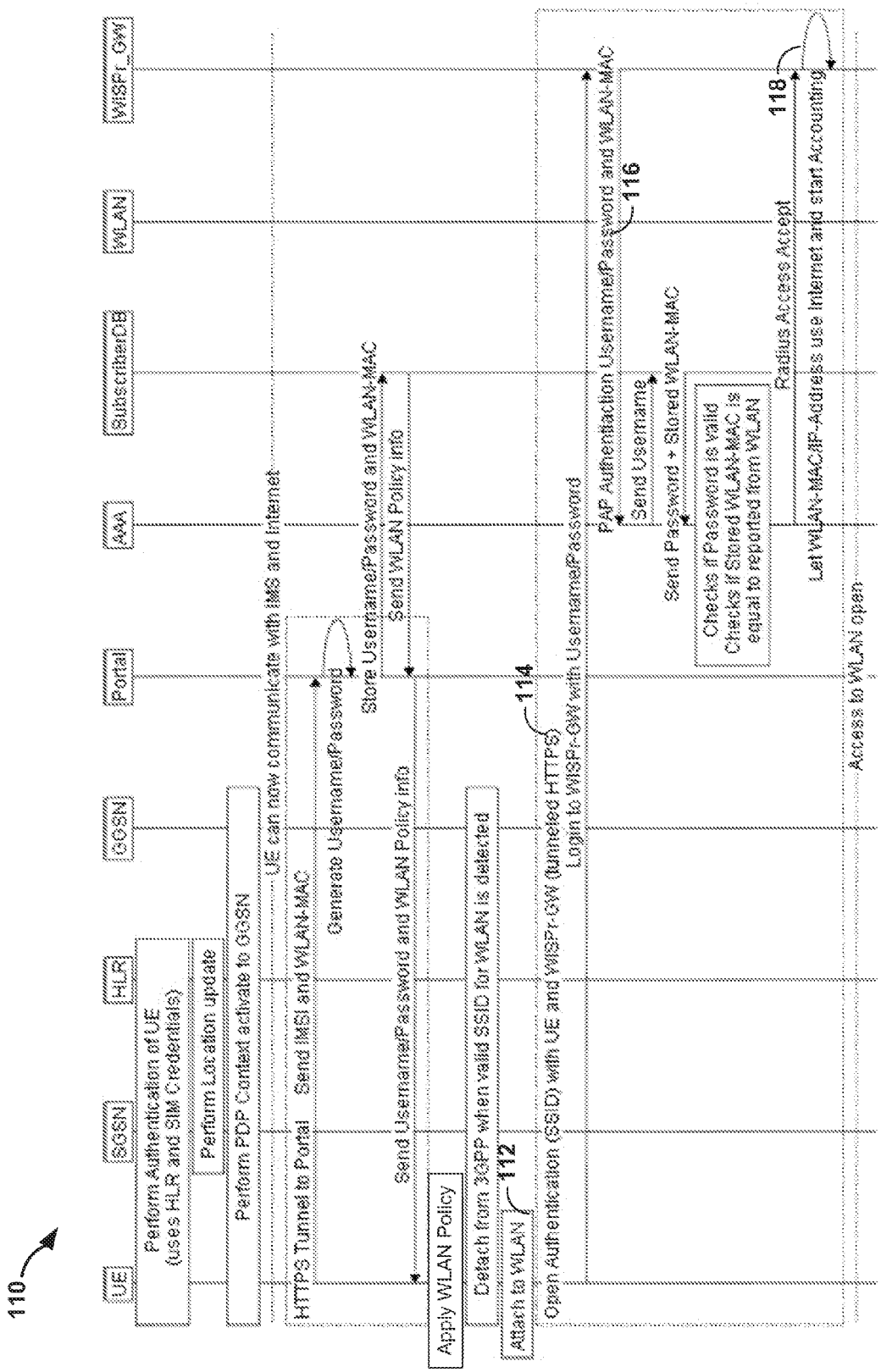

FIG. 6 is a sequence diagram 110 illustrating example operation of network devices in accordance with the techniques of this disclosure. The example of FIG. 6 illustrates operation of User Equipment (UE) (e.g., cellular mobile device 4), SGSN 20, HLR 24, GGSN 22, a portal (e.g., credential portal 34), AAA 40, WLAN access point 32, and a WISPr V1.0 Gateway in operating in accordance with another example aspect of this disclosure. Specifically, FIG. 6 illustrates example operation in a WISPr V1.0 network. The techniques may be similar to those described above with respect to WPA networks, with a few differences. For example, after the UE attaches to the WLAN (e.g., alternate access network 10) (112) using SSID, the UE opens authentication with the WISPr Gateway using SSID via tunneled HTTPS (114). Within the tunneled HTTPS session, the UE logs in to the WISPr Gateway using the username/password credentials provided by credential portal 34. The WISPr Gateway sends a PAP authentication (116) to AAA server 40 that includes the username/password and WLAN MAC address. AAA server 40 queries subscriber database 38 with the username, and subscriber database 38 returns the stored password and WLAN MAC address associated with the username. After AAA server 40 checks whether the password and WLAN MAC are valid and matching, AAA server 40 sends a RADIUS Access Accept to WISPr Gateway, and WISPr Gateway lets the WLAN MAC/IP address combination use the Internet and starts accounting (118).

Figure 7:
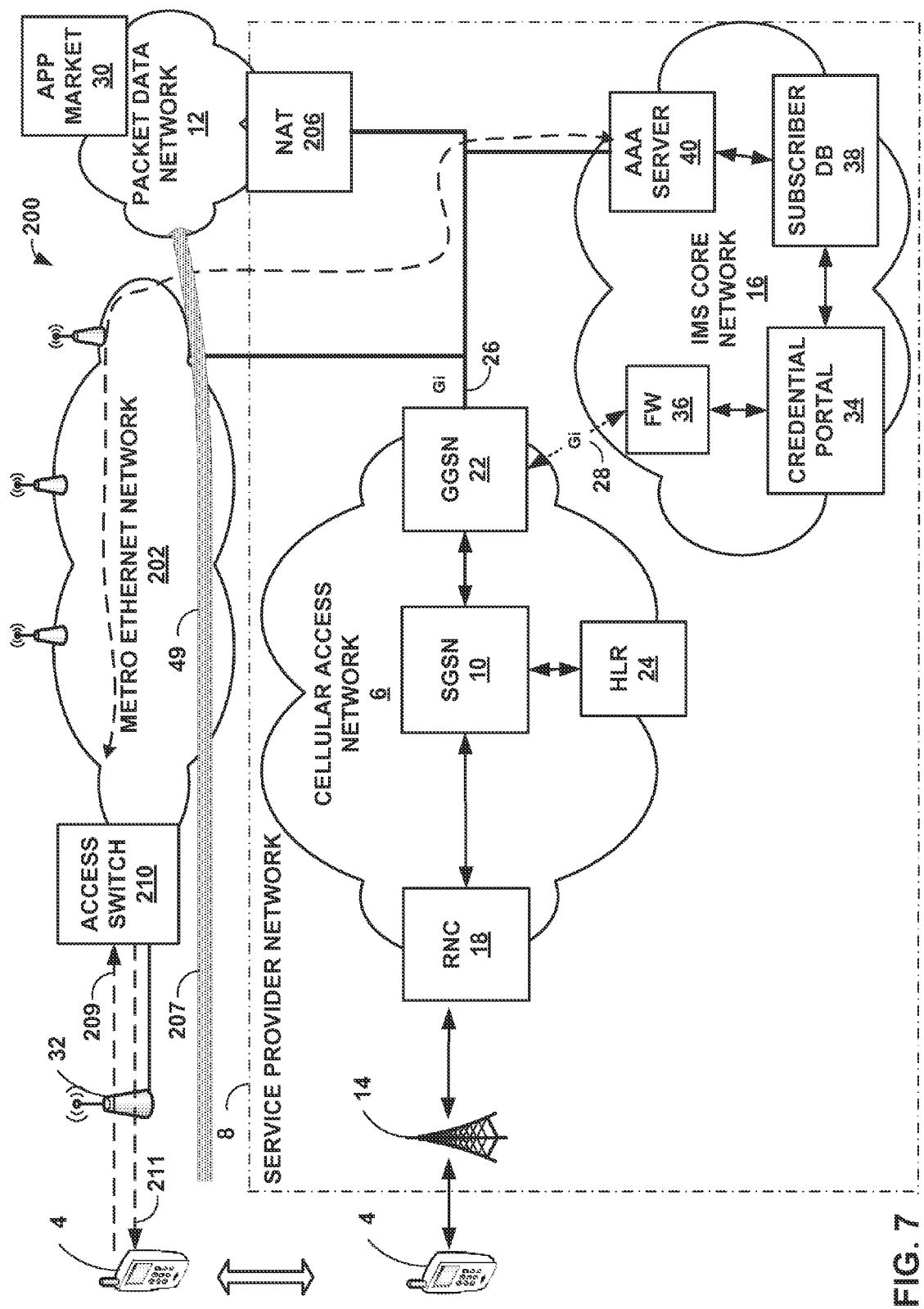
FIG. 7 is a block diagram illustrating an example network system that provides network address preservation when subscriber devices transition between cellular networks and a wireless local area network (WLAN).

FIG. 7 is a block diagram illustrating another example network system 200 that provides network address preservation when subscriber devices transition between cellular networks and a wireless local area network (WLAN). As described, the techniques may provide seamless mobility with uninterrupted application services while the mobile device 4 moves between the different networks. Moreover, the techniques may provide the seamless mobility without necessarily requiring that user traffic through the WLAN be anchored back into a terminating device within cellular network 6. As shown in FIG. 7, many of the components of network system 200 are similar to the components shown in the preceding figures. In this case, the components are numbered with similar reference numerals.

Cellular mobile device 4 and credential portal 34 may operates substantially similar to described above. For example, cellular mobile device 4 initially establishes data services through cellular access network 6. At this time, mobile service provider network 8 assigns cellular mobile device 4 an L3 network address for receiving data services through cellular access network 6. This may be accomplished in a variety of ways. For example, the L3 network address may be statically configured on cellular mobile device 4 or may be dynamically or statically assigned by GGSN 22 or by AAA server 40 in response to queries from GGSN 22. In this case, upon authentication of cellular mobile device 4 on HLR 24, GGSN 22 select an IP address from a pool of network addresses or may send a Radius authentication request including the identifier (IMSI) on the L2 domain. This allows AAA server 40 to select an IP address for cellular mobile device 4 to use over cellular access network 6.

Once data services through cellular access network 6 are established, the WiFi Offload Manager executing on cellular mobile device 4 establishes a communication session with credential portal 24 and provides certain information regarding the cellular mobile device. For example, as explained above with respect to FIG. 1B, the WiFi Offload Manager reports an identifier (e.g., IMSI or IMEI) stored with the SIM card of cellular mobile device 4 or on the cellular device itself as well as the WLAN MAC address of the WLAN interface of the cellular mobile device. Credential portal 34 updates records within subscriber database 38 to associate identifiers (e.g., IMSI or IMEI) from cellular mobile devices with the identifiers (e.g., L2 MAC address) for wireless local area network (WLAN) interfaces of the cellular mobile devices. In addition, in the example of FIG. 7, credential portal 34 updates the records with subscriber database 38 to store the L3 network addresses (e.g., IP addresses) assigned to cellular mobile device 4 by service provider network 8 for providing data service to cellular mobile devices 4 via cellular access network 6.

In the example of FIG. 7, a layer two (L2) network, such as a metro Ethernet network 202, provides alternate access for delivering data services to mobile cellular device 4. In this example, access switch 210 is an edge device that provides L2 connectivity to metro Ethernet network 202, which may be an L2 network provided by the service provider. Metro Ethernet network 202 may be a large-scale L2 network, possibly owned and managed by the same service provider that owns and manages cellular access network 6. Metro Ethernet network 202 may be, for example, a large-scale Ethernet network deployed in one or more metropolitan areas, airports, and other dense areas where the service provider wishes to provide data services through an alternate network. As shown in FIG. 7, the L2 domain of metro Ethernet network 202 extends into service provider network 8. For example, as shown, GGGSN 22, AAA server 40 and NAT device 206 each have network interfaces that are connected to the L2 domain provided by metro Ethernet network 202. In other words, metro Ethernet network 202 may be viewed as a layer 2 network that extends into IMS-core 16 of service provider network 8. As such, when cellular mobile devices 4 of subscribers of cellular access network6 transition to WLAN access points (e.g., WLAN access point 32), the WLAN interfaces of the wireless access devices are within the same L2 domain as GGSN 22 and AAA server 40. In another example, a WLAN controller may be physically located near GGSN 12 terminating the traffic from wireless access point 32.

In one example, access switch 210 is an edge switch that provides L2 switching functionality reachable by wireless access points, e.g., wireless access point 210. As one example, access switch 210 may be an MX Series edge router from Juniper Networks that provides integrated L2 switching and L3 routing functions. While discussed with respect to an L2 switch, access switch 210 may each represent any network device capable of providing L2 forwarding services. For example, access switch 210 may represent, in certain instances, one or more of a switch, a hub, a bridge device (e.g., an Ethernet bridge), or any other L2 network device and, in the case of an edge router, an L3 network device capable of performing L2 functionality.

In the example of FIG. 7, access switch 210 operates as a capture device that has the capability to operate as a DHCP relay agent. In general, the Dynamic Host Configuration Protocol (DHCP) is used by a DHCP client executing on mobile cellular device 4 to determine L3 address information (such as an IP address) from a DHCP server. DHCP uses the client's MAC (Layer 2) address to issue a query 209 for an L3 network address. Access switch 210 is configured to operate as a DHCP relay agent to pass the query onto AAA server 40 and, upon receiving a response from the AAA server, formulate a DHCP reply to cellular mobile device 4. For example, access switch 210 may receive L3 network address requests and, in turn, formulate a Radius request to retrieve subscriber-specific parameters from AAA server 40. For example, upon receiving the DHCP request, access switch 210 introduces a Radius request within metro Ethernet network 202 to request subscriber parameters for a subscriber having the WLAN MAC address specified in the DHCP request for the WLAN interface of cellular mobile device 4. In response to the request, AAA server 40 accesses subscriber DB 38 to correlate the WLAN MAC address with the identifier (e.g., IMSI) for cellular mobile device 4. Upon correlating the WLAN MAC address with the identifier for the particular subscriber device (cellular mobile device 4 in this example), AAA server retrieves the L3 network address currently assigned to cellular mobile device 4 for receiving data services through cellular network 6. AAA server 40 returns the currently assigned L3 network address to access switch 210, e.g., by way of a Radius response. Upon receiving the response, access switch 210 sends the IP network address back in the form of a DHCP lease 211. In this way, the L3 address for mobile cellular device 4 may be preserved as the mobile cellular device seamlessly transitions from cellular access network 5 to metro Ethernet network 202 for data services 207.

As such, applications executing on cellular mobile device 4 and utilizing data services to communicate with PDN 12, e.g., the Internet, may not necessarily experience any service interruption even though the cellular mobile device has transitioned to an alternate WLAN network for data services 207. Moreover, the seamless transition may be accomplished without necessarily requiring that subscriber data traffic from metro Ethernet network 202 be backhauled to an anchoring device (e.g., GGSN 22) within cellular access network 26. That is, the techniques described herein may avoid any requirement that the subscriber data traffic 207 be tunneled back to an anchoring termination point (e.g., GGSN 22) within cellular access network 6, such as may typically be required with IPSec-based or SSL VPN-based solutions. Moreover, the techniques described herein may be utilized with substantially existing network infrastructure without requiring substantial redeployment of technology. For example, as explained above, the techniques do not require modification of the DHCP protocol or components within metro Ethernet network 202, such as access switch 210.

NAT device 206 may be utilized to perform network address translation for private IP addresses assigned within the L2 domain provided by metro Ethernet network 202. In other words, NAT device 206 may translate private network addresses into a publicly routable address usable within packet data network 12. Alternative, the service provider may allocate static public IP address (e.g., public IPv6 network addresses) to each wireless cellular device, thereby avoiding the need for NAT device 206.

In the event cellular mobile device 4 transitions back to cellular access network 6 for data services, the cellular mobile device may likely flush its radio interface and obtain a new L3 address. In this case, AAA server and GGSN 22 issue the same IP address as previously assigned to cellular mobile device 4. For example, in the event cellular access network 6 utilizes dynamic IP address assignment from a pool of IP addresses, the DHCP lease for cellular mobile device 4 typically would have not expired due to use of the IP address within metro Ethernet network 202. More specifically, in the event cellular service provider network 8 utilizes a pool of private IP addresses maintained by GGSN 22 or AAA server 40, a guard time is used on Gi Interface 26 after a subscriber session is terminated. In other words, in the event cellular mobile device 4 transitions to metro Ethernet network 202, cellular access network 6 typically tears down the subscriber session. However, GGSN 22 or AAA server 40 refrains from reassigning the IP address of the torn down session for a period of time, e.g., five minutes, in the event cellular mobile device 4 is transitioning to metro Ethernet network 202 and, therefore, will shortly be requesting an IP address. This may avoid reusing an IP-Address too quickly within cellular access network 6 and avoid assigning the IP address to a different mobile device in the situation. Moreover, prior to freeing a DHCP lease on an IP address within the local pool of cellular access network 6, GGSN 22 or AAA determines whether IP-Address is currently being used within metro Ethernet network 202. For example, AAA server 40 may update subscriber database 38 to indicate that a network address previously assigned to cellular mobile device 4 within the cellular network is now assigned to the cellular mobile device for receiving data service within the metro Ethernet network 202. When assigning L3 network addresses to cellular mobile devices, GGSN 22 or AAA server may access subscriber database 38 to determine whether the L3 network addresses are currently assigned to any of the cellular mobile devices for use within metro Ethernet network 202.

The credential generation and automatic authentication techniques described above may optionally be used to further enhance seamless transition between cellular access network 6 and metro Ethernet network 202. Alternatively, other authentication techniques may be utilized. In other words, the network address preservation techniques described herein may be used in combination with the credential generation and automated authentication techniques described above. Alternatively, other authentication techniques may be used, in which case the credential portal need only collect information that allows for the subsequent correlation between identifiers of the mobile cellular devices (e.g., IMSIs) and the identifiers (e.g., L2 MAC addresses) for WLAN interfaces on those devices.

Figure 8:
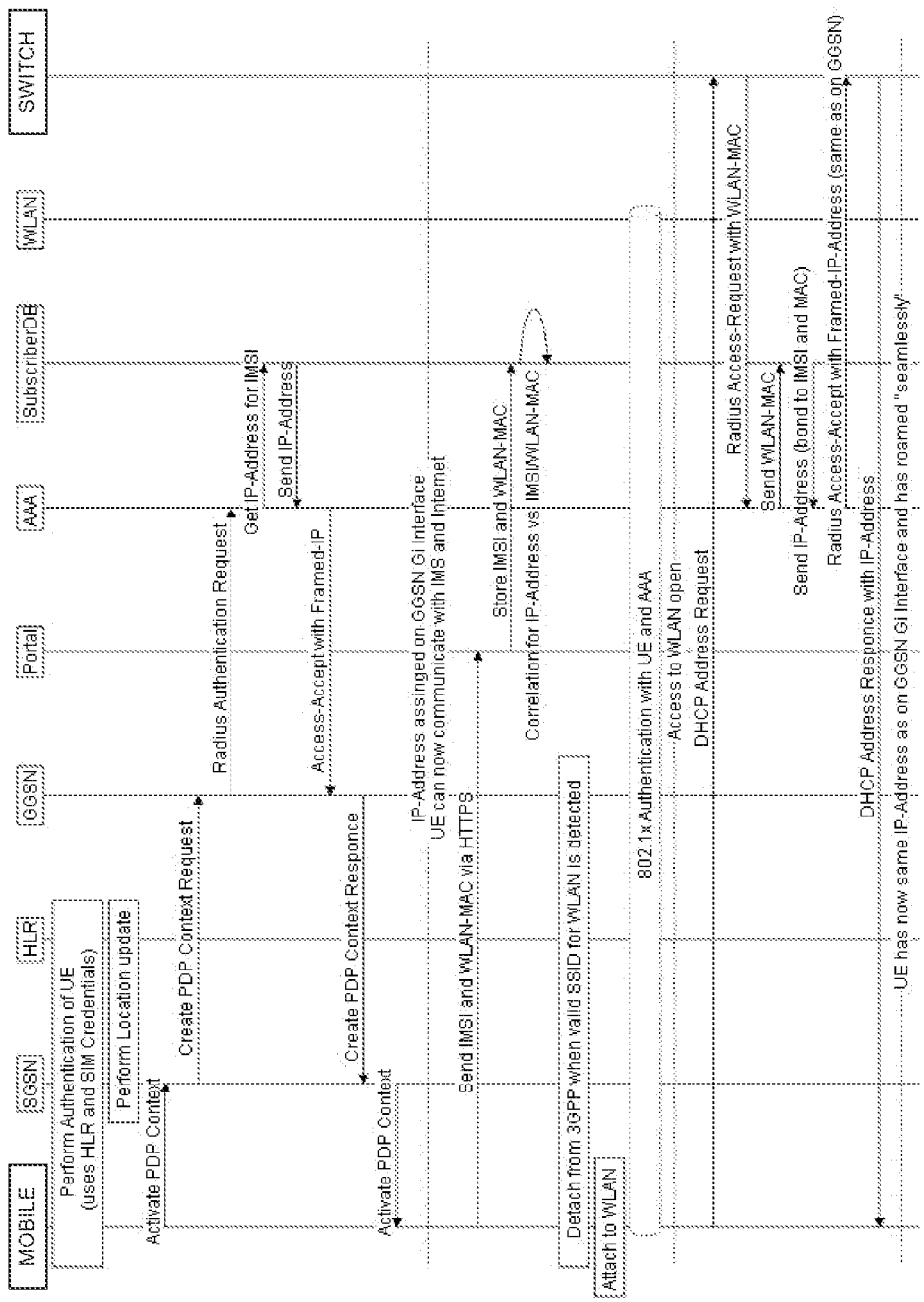
FIGS. 8 and 9 are sequence diagrams illustrating attachment and IP Address re-assignment for example scenarios of service provider IP-Address assignment.
Figure 9:
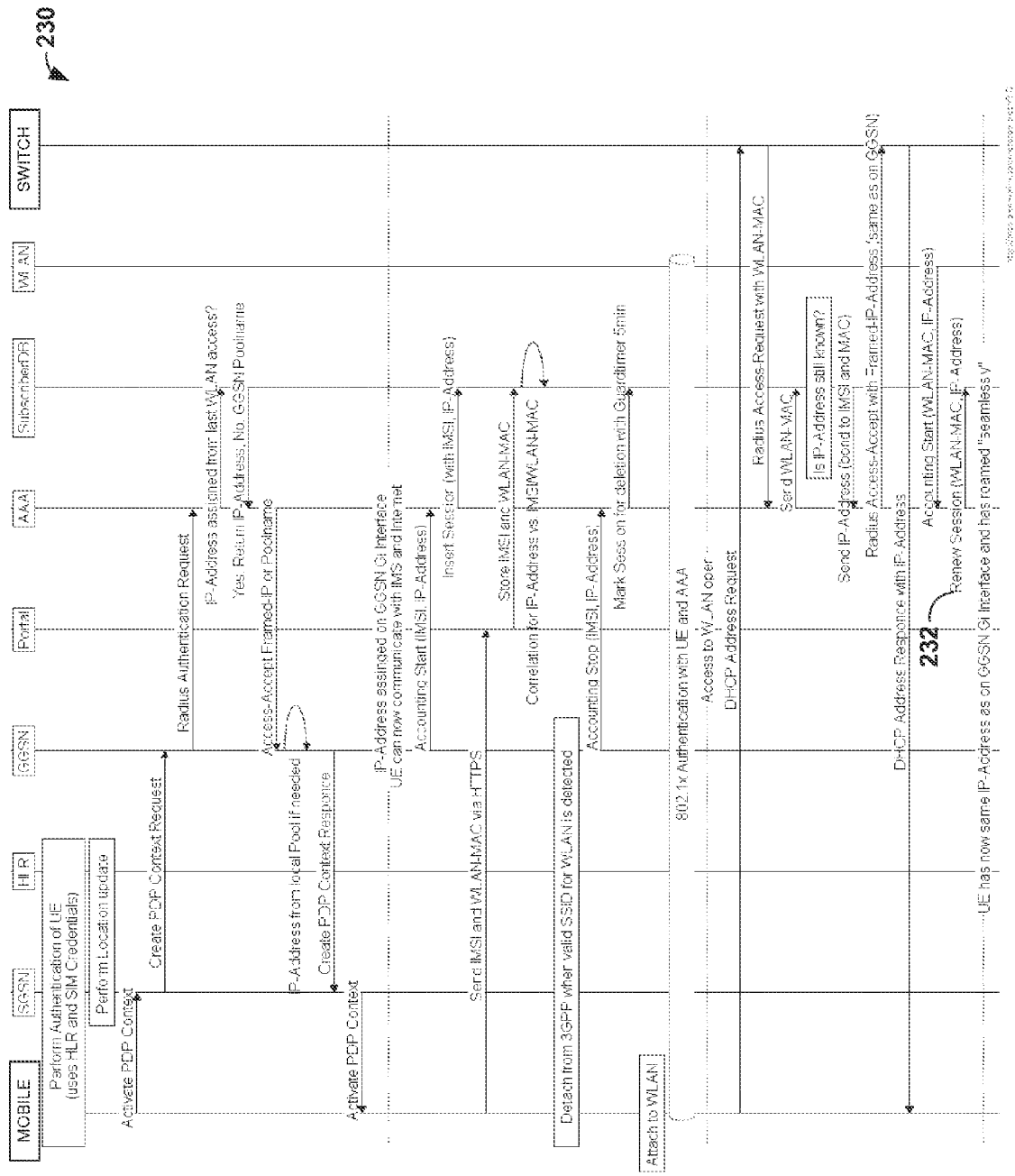

FIGS. 8 and 9 are sequence diagrams illustrating attachment and IP Address re-assignment for example scenarios of service provider IP-Address assignment. FIG. 8, for example, is a sequence diagram 220 illustrating the techniques when the service provider utilizes static assignment of private IP-addresses. In this case, information may be pre-provisioned in the subscriber database to correlate IMSIs and IP-Addresses. FIG. 9 is a sequence diagram 230 illustrating the techniques when the service provider utilizes dynamic assignment of private IP-addresses. account information is collected from the GGSN to correlate this in the subscriber DB to Upon transitioning to the metro Ethernet network, the AAA server 40 may issue a renew session message 232 to subscriber DB 38 to record that the existing data services over cellular network 6 are continuing via metro Ethernet network 202. This may, for example, help ensure proper accounting for the data services.

Figure 10:
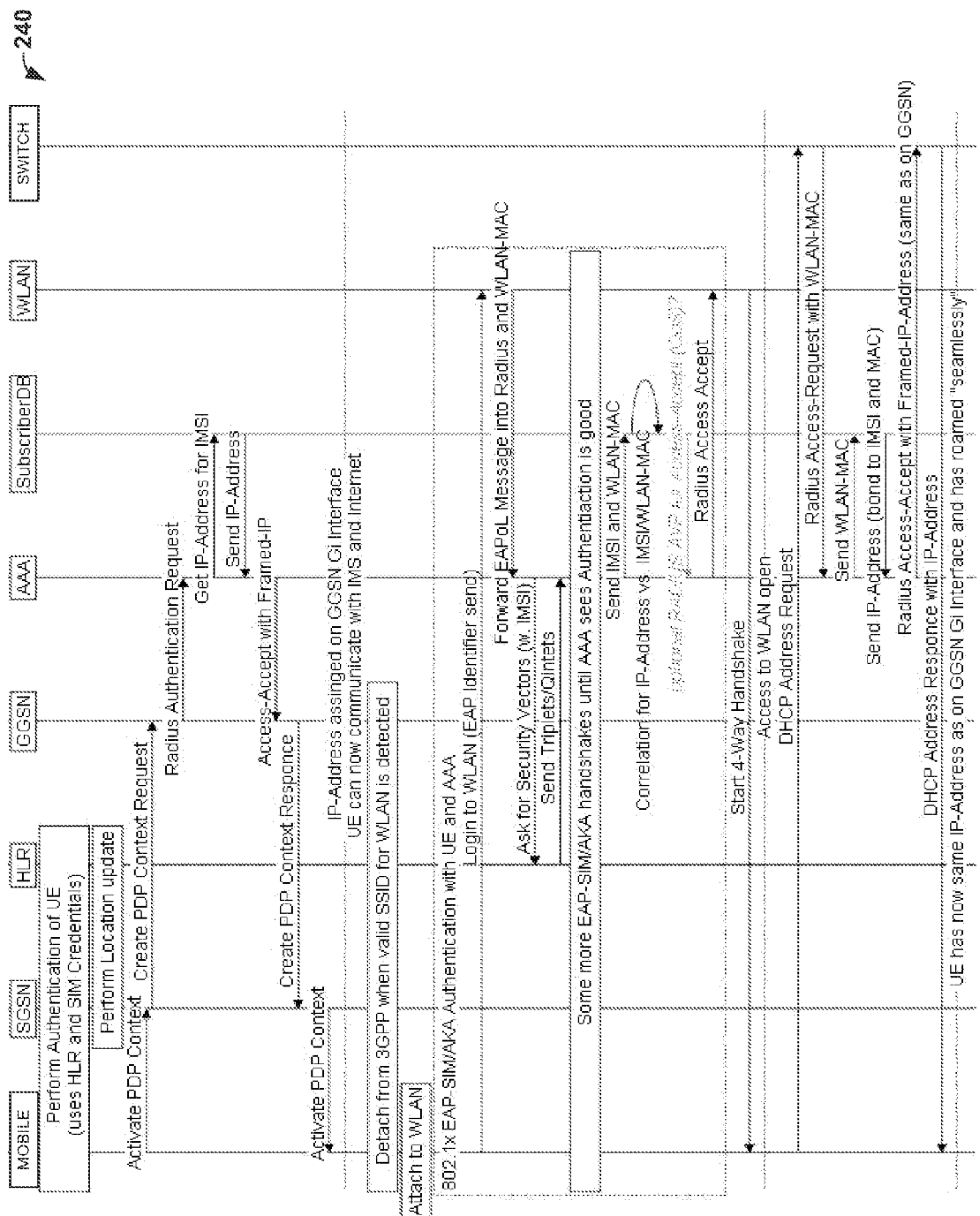
FIG. 10 is a sequence diagram illustrating the techniques when the mobile cellular device uses EAP-SIM or EAP-AKA authentication when attaching to the wireless Ethernet network.

FIG. 10 is a sequence diagram 240 illustrating the techniques when the information is obtained from an EAP-SIM or EAP-AKA authentication when mobile cellular device 4 attaches to wireless Ethernet network 4. In this case, EAP-SIM or EAP-AKA may be used to report the WLAN MAC address of mobile cellular device as a Radius calling station identifier (ID) so that inside the EAP process the information is available to AAA server 40 for correlating the WLAN MAC address to a previously assigned IP address. The EAP-SIM or EAP-AKA Authentication method also provides the information about the mobile device 4 International Mobile Subscriber Identifier (IMSI) stored within a subscriber identity module (SIM) of the cellular mobile device 4. This information allows a direct correlation of the Mobile device and his WLAN MAC address as an alternative to obtaining this information via an Wi-Fi Offload Manager and Credential Portal 34. However, this alternative would require cellular mobile device 4 to support EAP-SIM or EAP-AKA, where the techniques described above with WiFi Offload manager functionality likely works on almost all mobile devices 4.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media. In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

Various aspects of this disclosure have been described. These and other aspects are within the scope of the following claims.

The invention claimed is:

1. A method comprising:
maintaining, by a credential portal responsive to communication from a cellular mobile device, a subscriber database that associates an identifier from the cellular mobile device with a network address assigned to the cellular mobile device by a cellular network for providing data service to the cellular mobile device, wherein the subscriber database further stores an identifier for a wireless local area network (WLAN) interface of the cellular mobile device that provides data service to the cellular mobile device when in the presence of a local wireless network;
providing data services to the cellular mobile device through the cellular network using a network address assigned to the cellular mobile device;
receiving, with an authentication server of the service provider network, a network access request from an access device of the local wireless network, wherein the network access request specifies the identifier for the WLAN interface for the cellular mobile device;
based on the identifier of the WLAN interface specified within the request, accessing the subscriber database with the authentication server to retrieve, from the subscriber database, the network address assigned to the cellular mobile device by the cellular network; and
outputting a message from the authentication server to the access device to assign the retrieved network address to the cellular mobile device for receiving data service within the local wireless network.

2. The method of claim 1,
wherein the identifier from the cellular mobile device comprises an International Mobile Subscriber Identifier (IMSI) stored within a subscriber identity module (SIM) of the cellular mobile device,
wherein the network address assigned to the cellular mobile device for the cellular network comprises an Internet Protocol (IP) network address, and
wherein the identifier for the WLAN interface comprises a media access control (MAC) address.

3. The method of claim 1, further comprising:
while providing data services to the cellular mobile device through the cellular network, receiving at the credential portal, by a hypertext transfer protocol (HTTP), a communication from the cellular mobile device, wherein the communication comprises an HTTP message that reports the identifier from the cellular mobile device, the network address allocated to the cellular mobile device for the cellular network and the identifier of the WLAN interface on the cellular mobile device; and
with the credential portal, inserting a record within the subscriber database to associate the identifier from the cellular mobile device and the network address allocated to the cellular mobile device within the cellular network with the identifier of the WLAN interface on the cellular mobile device.

4. The method of claim 3, further comprising
intercepting, with the access device, a DHCP request from the wireless mobile device when transitioning from the cellular network to the local wireless network; and
in response to intercepting the DHCP request, outputting a RADIUS request from the access device to the authentication server of the service provider network, wherein the RADIUS access request includes the identifier of the WLAN interface for the cellular mobile device.

5. The method of claim 4, further comprising:
receiving, with the access device, the message from the authentication server assigning the network address to the cellular mobile device; and
outputting a DHCP response from the access device to communicate the retrieved network address to the cellular mobile device for receiving data service within the local wireless network.

6. The method of claim 1, further comprising updating the subscriber database to indicate that the network address previously assigned to the cellular mobile device within the cellular network has been assigned to the cellular mobile device for receiving data service within the local wireless network.

7. The method of claim 6, further comprising:
maintaining a pool of network addresses for assignment to cellular mobile devices when requesting data services through the cellular network; and
when assigning the network addresses to the cellular mobile device, accessing the subscriber database to determine whether the network addresses are currently assigned to any of the cellular mobile devices for receiving data service within the local wireless network.

8. The method of claim 1, wherein maintaining a subscriber database includes:
receiving, at the credential portal, a communication from the cellular mobile device, wherein the communication comprises a hypertext transfer protocol (HTTP) message that reports the identifier from the cellular mobile device, the network address allocated to the cellular mobile device for the cellular network and the identifier of the WLAN interface on the cellular mobile device;
inserting, via the credential portal, a record within the subscriber database to associate the identifier from the cellular mobile device and the network address allocated to the cellular mobile device within the cellular network with the identifier of the WLAN interface on the cellular mobile device;
generating authentication information; and
transferring the authentication information from the credential portal to the cellular mobile device through the cellular network;
wherein receiving a network access request includes receiving the authentication information.

9. The method of claim 8, wherein the authentication information includes a username and password.

10. An authentication system of a cellular service provider network, the authentication system comprising:
a server having one or more hardware processors executing a credential portal that maintains a subscriber database of records for subscribers of the cellular service provider network, wherein the records associate identifiers from cellular mobile devices of the subscribers with network addresses assigned to the cellular mobile device by the cellular network for providing data service to the cellular mobile devices, and wherein the records further store identifiers for wireless local area network (WLAN) interfaces of the cellular mobile devices; and
an authentication server coupled to a local wireless network having a plurality of wireless access points, wherein a hardware processor of the authentication server is configured to, in response to access requests from the cellular mobile devices over the local wireless network, query the subscriber database of the cellular service provider network to match WLAN interface identifiers specified within the access requests with the identifiers of WLAN interfaces stored in the subscriber database and to retrieve network addresses associated with the matched WLAN identifiers for assignment to the cellular mobile devices.

11. The authentication system of claim 10,
wherein the identifiers from the cellular mobile devices comprises International Mobile Subscriber Identifiers (IMSIs) stored within subscriber identity modules (SIMs) of the cellular mobile devices,
wherein the network addresses assigned to the cellular mobile devices for the cellular network comprise Internet Protocol (IP) network addresses, and
wherein the identifiers for the WLAN interfaces comprise media access control (MAC) addresses.

12. The authentication system of claim 10,
wherein the authentication server, in response to the network access requests, accesses the subscriber database to use the identifiers of the WLAN interfaces specified within the network access requests to retrieve network addresses assigned to the cellular mobile devices by the cellular network; and
wherein the processor of the authentication server is configured to output messages to the access devices to assign the network addresses to the cellular mobile devices for receiving data service within the L2 network.

13. The system of claim 10, wherein the credential portal generates authentication information used in WLAN access requests by the cellular mobile device.

14. The system of claim 13, wherein the authentication information includes a username and password, wherein the username and password are based on the identifier from the cellular mobile device and on the identifier for the mobile device's WLAN interface.

15. A non-transitory computer-readable medium comprising instructions for causing a programmable processor of an authentication server to:
receive, with the authentication server, a network access request from an access device of a layer two (L2) network, wherein the network access request specifies an L2 network address of a wireless local area network (WLAN) interface of a cellular mobile device and wherein the network access request includes authentication information provided by a credential portal, wherein the authentication information is based on a WLAN interface identifier and a cellular network interface identifier associated with the cellular mobile device; and
authenticate, with the authentication server, the cellular mobile device based on the authentication information provided by the credential portal through the access device; and
access, with the authentication server, a subscriber database maintained by the credential portal, where accessing includes retrieving, using the L2 network address of the network access request, a layer three (L3) network address currently assigned to the cellular mobile device via a cellular network, wherein the subscriber database includes a record that specifies an International Mobile Subscriber Identifier (IMSI) stored within a subscriber identity module (SIM) of the cellular mobile device, the L3 network address currently assigned to the cellular mobile device by the cellular network for providing data service to the cellular mobile device, and the L2 network address of the WLAN interface of the cellular mobile device.

16. The non-transitory computer-readable medium of claim 15, further comprising instructions for causing the programmable processor to output a message from the authentication server to the access device to assign the retrieved L3 network address to the cellular mobile device for receiving data service within the L2 network.

17. A system comprising:
- a cellular network to provide data services to a plurality of cellular mobile devices;
- a local area network having a plurality of wireless access points to provide data services to the cellular mobile devices over wireless local area network (WLAN) interfaces of the cellular mobile devices;
- a server executing a credential portal that, in response to messages received from the cellular mobile device via a hypertext transfer protocol (HTTP) protocol, maintains a subscriber database of records, wherein each record specifies an International Mobile Subscriber Identifier (IMSI) stored within a subscriber identity module (SIM) of respective ones of the cellular mobile devices, a layer three (L3) network address currently assigned to the respective cellular mobile device by the cellular network, and a layer two (L2) network address of the WLAN interface of the respective cellular mobile device; and
- an authentication server that, in response to access requests from the cellular mobile devices over the local area network, queries the subscriber database of the cellular service provider network and retrieves the L3 network addresses for the cellular mobile devices by:
    - matching L2 network addresses specified within the access requests to the L2 network addresses within the subscriber database for the WLAN interfaces, and
    - determining, based on the matching L2 network addresses within the subscriber database, the L3 network addresses currently assigned to the cellular mobile devices by the cellular network.

18. The method of claim 1, wherein maintaining a subscriber database includes:
- generating, at the credential portal, authentication information; and
- transferring the authentication information from the credential portal to the cellular mobile device through the cellular network.

19. The method of claim 18, wherein each access request includes the authentication information transmitted to the cellular mobile device by the credential portal.

20. A non-transitory computer-readable medium comprising instructions for causing a programmable processor of a credential portal to:
- receive, from a cellular mobile device, a cellular network interface identifier and a wireless local area network (WLAN) interface identifier for the cellular mobile device, wherein the cellular network interface identifier is used by the cellular mobile device to provide data service on a cellular network and the WLAN interface is used by the cellular mobile device to provide data service on a WLAN;
- store, in a subscriber database, a network address assigned to the cellular mobile device by the cellular network;
- associate, within the subscriber database, the network address assigned to the cellular mobile device with the cellular network interface identifier of the cellular mobile device;
- associate, within the subscriber database, the network address assigned to the cellular mobile device with the wireless local area network (WLAN) interface identifier of the cellular mobile device;
- generate authentication information based on the cellular network identifier and the WLAN identifier; and
- transmit the authentication information to the cellular mobile device;
- wherein the authentication information is used by the cellular mobile device to retrieve the network address from the subscriber database through the WLAN.

\* \* \* \* \*